Patented Nov. 12, 1940

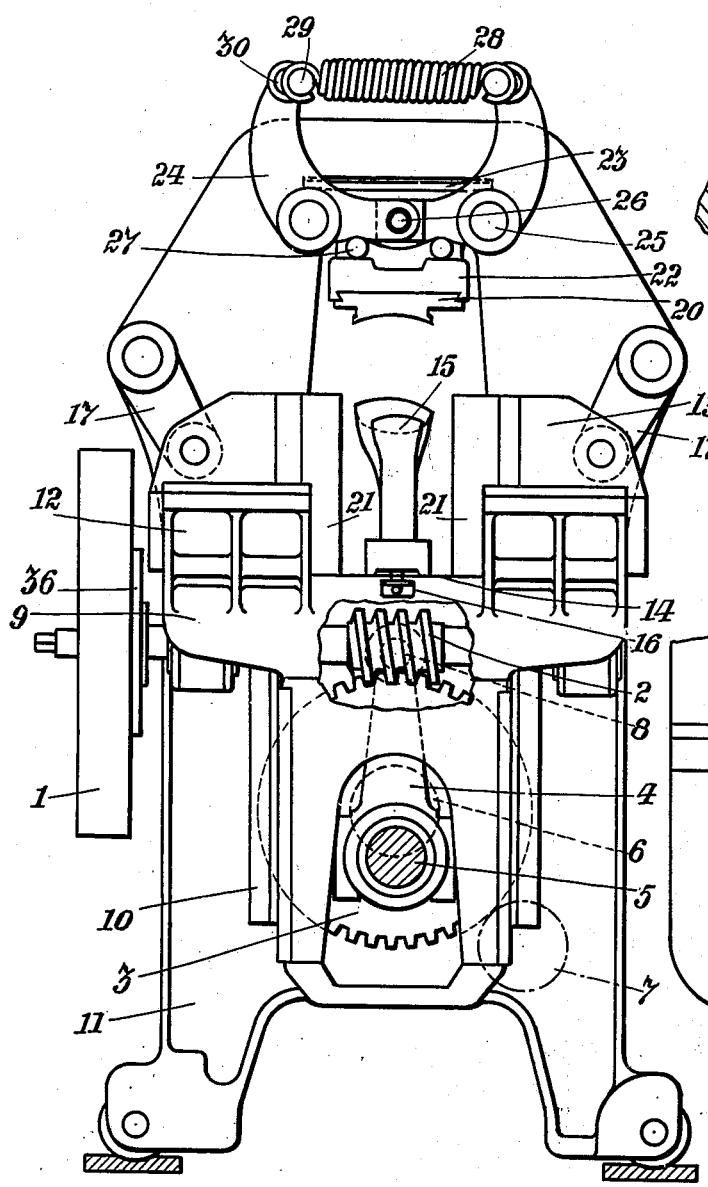

2,221,742

UNITED STATES PATENT OFFICE 2,221,742

RUBBER MOLDING PRESS

John Hoza, Zlin, Czechoslovakia

Application January 10, 1939, Serial No. 250,120½
In Czechoslovakia September 11, 1937

11 Claims. (Cl. 18—17)

This invention relates to a press for the manufacture of rubber articles, for instance rubber articles of footwear.

An object of the invention is to improve and simplify the construction of presses for the manufacture of rubber articles by molding and hot-vulcanisation by use of a heated mold.

Another object is to provide a press in which the mold has two laterally movable component parts and a vertically movable component part and in which the vertically movable part is acted on by a system of levers which are fulcrumed in the press frame and are acted upon by one or more initially stressed springs, this latter mold part receding, on occurrence of a pressure which exceeds the initial stress, and thereby extending the period during which the rubber body being molded is subjected to pressure and heat. As these springs are arranged on normally stationary parts, they can be readily adjusted in stress by known devices so that their initial stressing can be chosen to suit the size or nature of the article to be made.

Another object is to provide a press in which the side component parts of the mold are moved in such a manner by suitable members that they approach one another symmetrically as they are raised, deriving the vertical component of this motion from the vertically displaceable table of the press. Such an arrangement makes the press very simple in construction, for the heavily stressed movable parts which impart the vertical motion to the table are acted upon only by vertical forces.

Another object is to provide a press in which a gear-wheel for transmitting the requisite rotary motion to the crankshaft or eccentric shaft of the press is disposed between the cranks, or the eccentrics, transmitting the motion through connecting rods to the table, whereby the overall width of the press and the possibility of injury from the gear-wheel are reduced.

Another object of the invention is to provide in such a press a mold consisting of three heated, for instance electrically heated, outer parts and an inner part which acts as the core and which is also electrically heated, both in the rest or inoperative position, in which it is in front of the press, and in the operative position, in which it is between the laterally movable mold parts, or jaws, approaching one another. Continuous heating might also be provided. Said core in the case of the manufacture of footwear has the form of and serves the purpose of a last.

Another object is to make provision whereby the core, when slid into the operative position of the press, closes an electric circuit led from an electric motor driving the crankshaft, or eccentric shaft of the press, so that said motor can be in operation only when the core properly occupies the operative position.

Another object of the invention is to interpose rollers between the vertically movable mold part, or jaw, and the spring-loaded lever system carrying said component. Thus, this lever system is saved from becoming worn, and steady action of the forces acting on said mold part is ensured so that consequently a steady pressure without shocks can be exercised.

Further objects of the invention will be apparent from the following description of the accompanying drawing and the appended claims.

In the drawing a constructional example of a press according to the invention is illustrated.

Fig. 1 is an elevation of the press, partly in section.

Fig. 2 shows a modified way of operating the movable side jaws.

Fig. 3 is a plan view to a smaller scale of the press table and of a working plate thereon.

A belt pulley 1 (which derives its motion from an electric driving motor or any source of driving power) drives in the illustrated case the worm gear 2, 3, which actuates connecting rods 4. The latter are connected to cranks 5 disposed one on each side of the worm-wheel 3, which rotates a crankshaft consisting of the cranks 5 and of journals 6 supported by bearings mounted on the frame 11 of the press.

In another constructional form, the crank- and connecting-rod mechanism 5, 4, might be replaced by eccentric-and-rod mechanism, and/or the worm gear 2, 3, might be replaced by ordinary spur-wheel gearing (of which gearing in Fig. 1 for instance a pinion 7 is indicated by dot-and-dash lines). Each connecting rod 4 embraces with its upper eye a pin 8 mounted in a vertically movable support constituted as a table 9, which is guided on the one hand by guiding means 10 on the frame 11 of the press, and which on the other hand has guiding means 12 for laterally movable jaws 13, in which are fixed in a suitable manner side component parts of the mold required for forming the article to be produced. The jaws 13 are slidable in the guideways 12 extending towards one another above the upper surface 14 of the movable table 9. On this surface is also erected a foot 15 which, when footwear is to be produced, has the form of a last and acts as a mold core. The foot 15 is slidable along a groove 16 in the table 9 and is held and guided in the groove 16 by a device of a kind known per se; for instance a guide in the form of a T-head.

On the press table 9 rising, the laterally slidable parts 13 with the attached mold side parts 21 approach one another along the guideways 12 under the control of guiding members which incline towards one another. In Fig. 1, these guiding members have the form of links 17 which are arranged to turn about pivots in the frame 11. Fig. 2 shows a modification, in which as a substitute for the links which incline towards one another, inclined or curved cam surfaces 18 are provided, against which slide parts 19 on the side component parts 21 of the mold. In both cases the lateral motion of the parts 13 or 19 is brought about by the vertical motion of the table 9.

An upper component part 20 of the mold is fixed to a carrier 22 which is guided in the frame and is suspended by means of the element 23 in such a manner that the lower position of the part 20, in the constructional example shown, is limited through the element 23 resting on the bosses of toggle levers 24 which are fulcrumed to turn about pivot pins 25 supported in the frame 11. A pin 26 extends from an arm of one of said levers through an arm of the other, so that said pin connects these levers loosely with one another. A modified form of connection between such levers is one in which toothed segments at the lever ends intermesh. A symmetrical motion of these levers 24 is thus obtained. The interconnected lever arms rest upon the carrier 22 at places equidistant from the axes of the pins 25, the carrier 22 bearing against said arms whenever the upper mold part 20 is forced upwards. As shown, rollers 27 are interposed between the lever arms and the carrier 22.

The other arms of the levers 24 are interconnected by one or more springs 28 of an adjustable initial tension, which are attached for instance to anchorage pins 29 on the lever arms. For adjusting the initial tension of the springs 28, the pins 29 are for instance made eccentric with respect to turnably adjustable journal pins 30 in the upper ends of the lever arms. The pins 30 are secured in adjusted position for instance by set screws (not shown). Adjustment of the initial tension of the spring 28 might be effected in another way, namely by mounting the pins 29 on screws in such a manner that they are brought closer together or further apart.

In Fig. 3 a diagrammatic plan view, of the upper surface 14 of the table 9 is shown, the parts 13 being removed. In the plate presenting the surface 14 is the groove 16 in which the foot 15 is slidable. Against this surface there registers, when the table is in its lower position, a working plate 32 which has a groove 33 forming a continuation of the groove 16. The groove 33 is suitably curved and forked for enabling the press to be served from each side. In the grooves 16 and 33 are mounted electric-circuit contacts 34, 35, the electric current for heating the foot, when in the position of rest, being taken from a contact 35 and, when in the operative position, from the contact 34.

The contact 34 serves a further purpose when the foot is in the correct operative position, namely, to complete the electric circuit (for instance, one phase) of the driving motor, so that the press cannot be started up while the foot occupies any other position. Accidental damage to the mold jaws is thereby prevented.

For enabling the manufactured articles to be vulcanised in the press, the mold parts 20, 21, 15 are heated, for instance electrically.

The press operates as follows: The operator slides the foot 15, with the article placed on it for vulcanisation, from the rest position in which it is heated by electric current from the contact 35 into the operative position in which it closes the circuit through one phase of the electric motor by means of the contact 34 and at the same time closes the electric heating circuit. He thereupon starts the electric motor. The movable table 9 is raised from the lower position into the upper position, the upper jaws 13 are forced to approach one another as they are carried upwards until they strike against the upper part 20 of the mold and, overcoming the opposition due to the initial tension of the springs 28, force this part up. This action continues until a suitable device, not shown in the drawing, by disconnecting a coupling 36 between the driving pulley 1 and its shaft and braking one of the press parts which up to this moment have been rotating, brings the parts moving with and operated by the actuating gear 2, 3, to rest. Another possible way of effecting this is to put the driving means out of operation and brake the same.

The press is then kept closed for the prescribed period, for instance by an automatic time locking device, in order to enable the article to be vulcanised in a reliable manner. The article is subjected during the period, during which the press is locked, to the action of pressure and heat. Owing to the fact that the upper part 20 of the mold yields resiliently before the uprising table 9, on the one hand the period is lengthened during which the article in the mold is subjected when being vulcanised to pressure and heat, whereas on the other hand, owing to the yielding motion which (although a straight-line motion of the part 20 of the mold is aimed at for the purpose of pressing) is not a straight-line motion because of backlash and deformation of the mechanism, the article is subjected while in the plastic state to a light kneading action, as the place of greatest pressure in the article being made shifts in consequence of said motion. This shifting of the place of greatest pressure contributes to the mold being completely filled with plastic material and consequently also to the perfection of the product.

After vulcanisation is finished, the press is automatically opened and brought to rest in the lowest position of the table 9, the foot 15 with the finished article is pushed along the grooves 16, 33 to the contact 35 at one or other side of the working plate 32, and the finished product removed from the foot 15.

The working parts 20, 21 of the footwear mold are heated by a heating agent, for instance by electric current, and may be kept at constant heat for instance by thermostatically controlled elements. In the circuit of the heating means, a signalling device may be interposed which calls for attention of the operator to an incorrect temperature of any particular part of the mold and which may be adapted to stop the press.

I claim:

1. A press for the manufacture of hot-vulcanised rubber articles, comprising a frame, a support guided for vertical movement by said frame, means for moving said support upwards, a heated mold consisting of a pair of laterally movable components on said support and a vertically movable component on said frame, said laterally movable components being carried and guided by said support, a core adapted to hold an article to be produced, said core being attachable between said laterally movable components to said support, means on the frame for imparting inward movement to said laterally movable components, as said support is moved upwards, said components being thus forced together towards said core and together therewith towards said vertically movable component to close the mold, said laterally movable components finally engaging said vertically movable component and forcing it to rise, lever means fulcrumed on said frame, and spring means acting through said lever means to press said vertically movable component against an article on said core and later to yield under the upward force of said laterally movable components applied to said vertically movable component.

2. A press for molding rubber articles comprising a support, means for moving said support, a mold consisting of a pair of opposed heated components on said support and a third heated component, a mold core on said support, means for heating said core, means for effecting movement of said opposed components towards said core and towards said third component by movement of said support in order to close the mold, symmetrically arranged levers fulcrumed in a stationary location, a suspensory connection between said third component and said levers, spring means acting on said levers to resiliently oppose movement of said third component due to the force of said opposed components, and means for adjusting the initial stress of said spring means.

3. In a press for molding rubber articles including a mold composed of relatively movable and interengageable components, means carrying one of said components in a normally stationary location, a movable support for others of said components, means for imparting movement to said support so as to bring said others of the components into contact with said one of them, means acting to close said others of the components towards one another by the movement of said support, and spring means acting on said carrying means to apply molding pressure to an article through said one of the components and to yieldingly oppose displacement of said one of the components by contact with said others thereof.

4. In a press for molding rubber articles including a mold composed of relatively movable and interengageable components, a lever system supporting one of said components in a normally stationary location, a movable support for others of said components, means for imparting movement to said support so as to bring said others of the components into contact with said one of them, means acting to close said others of the components towards one another by the movement of said support, spring means acting on said lever system to yieldingly oppose displacement of said one of the components by contact with said others thereof, and means for adjusting the initial stress of said spring means.

5. In a press for molding rubber articles including a mold composed of relatively movable and interengageable components, an assembly of inter-engaging levers fulcrumed in stationary locations, a suspensory connection between said levers and one of said components, a movable support for others of said components, means for imparting movement to said support so as to bring said others of the components into contact with said one of them, means acting to close said others of the components towards one another by the movement of said support, rollers interposed between said one of the components and said levers, and spring means acting on said levers to apply molding pressure to an article through said rollers and said one of the components and to yieldingly oppose displacement of said one of the components by contact with said others thereof.

6. In a press for molding rubber articles, a mold comprising relatively movable outer components and an inner core, said outer components consisting of a pair of said components in opposed relationship and a third component, a support on which said opposed components are mounted, means on said support for guiding said inner core into an operative position between said opposed components, means for displacing said support so as to bring said opposed components and said core in unison towards the third component, additional means for simultaneously displacing said opposed components towards one another and towards said core, and resiliently yieldable means holding said third component located for engagement by an article on the inner core and later by said opposed components.

7. A press for the manufacture of hot-vulcanised rubber articles, comprising a frame, a support guided for vertical movement by said frame, a core for the articles to be molded, said core being mounted on said support and being displaceable thereon to a rest position and an operative position alternately, means for moving said support vertically, a heated mold consisting of a pair of laterally movable components on said support and a vertically movable component on said frame, means for imparting lateral movement to said laterally movable components to force them together towards said core when in the operative position and towards said vertically movable component and thus close the mold, lever means fulcrumed on said frame, initially stressed spring means acting yieldingly through said lever means to exert pressure on said vertically movable component, means for heating said core, and elements in both of said rest and operative positions for connecting the core when in each of said positions to said heating means.

8. A press for the manufacture of hot-vulcanised rubber articles, comprising a frame, a support guided for movement by said frame, a core for the articles to be molded, said core being mounted on said support and being displaceable thereon to a rest position and an operative position alternately, means for moving said support, a mold consisting of a pair of movable components on said support and a co-acting component on said frame, means for imparting movement to said movable components to force them together towards said core when in the operative position and towards said co-acting component and thus close the mold, means for heating said core, and elements in both of said rest and operative positions for connecting the core when in each of said positions to said heating means.

9. A press for the manufacture of hot-vulcanised rubber articles, comprising a frame, a support guided for movement by said frame, electromotor-operated means for moving said support, a mold consisting of a pair of movable components on said support and a coacting component on said frame, means for imparting movement to said movable components to force them together and towards said coacting component and thus close the mold, a core for the articles to be molded, said core being mounted on said support and being displaceable thereon to-and-from an operative position, and contact means connected in the electric circuit of the electromotor and located at said position for engagement there by said core to close said circuit and only then render the electromotor operable.

10. A press for the manufacture of hot-vulcanised rubber articles, comprising a frame, a support guided for vertical movement by said frame, means for moving said support vertically, a mold consisting of a pair of laterally movable components on said support and a vertically movable component on said frame, means for imparting lateral movement to said laterally movable components to force them together and towards said vertically movable component and thus close the mold, lever means fulcrumed on said frame, said lever means consisting of a system of levers, means connecting said levers to said vertically movable component of the mold rollers interposed between said component and said levers to transmit thereto the action of said component, and spring means acting yieldably through said lever means to exert pressure on said vertically movable component.

11. A press for molding rubber articles comprising a support, means for moving said support, a mold consisting of a pair of opposed molding components on said support and a third molding component, a mold core on said support, means for effecting movement of said opposed components towards said core and towards said third component in the movement of said support in order to close the mold, lever means fulcrumed in a stationary location, a suspensory connection between said third component and said lever means, and spring means acting on said levers to resiliently oppose movement of said third component due to the force of said opposed components.

JOHN HOZA.